United States Patent [19]

White

[11] Patent Number: 5,726,405
[45] Date of Patent: Mar. 10, 1998

[54] WASTE WATER TREATMENT METHOD AND APPARATUS

[76] Inventor: Jeffrey A. White, 25 Dossetter Way, Ottawa, Ontario, Canada, K1G 4S3

[21] Appl. No.: 547,817

[22] Filed: Oct. 25, 1995

[30] Foreign Application Priority Data

Oct. 11, 1995 [CA] Canada ................. 2160329

[51] Int. Cl.$^6$ ................................................. C02F 1/22
[52] U.S. Cl. .................. 210/718; 210/737; 210/747; 210/906
[58] Field of Search .................. 210/702, 718, 210/747, 767, 808, 902, 903, 600, 737, 750, 766, 906

[56] References Cited

U.S. PATENT DOCUMENTS

| | | | |
|---|---|---|---|
| 3,751,358 | 8/1973 | Elliot | 210/766 |
| 4,018,682 | 4/1977 | Boyer | 210/747 |
| 4,160,725 | 7/1979 | Josis et al. | 210/750 |
| 5,208,998 | 5/1993 | Oyler, Jr. | 34/5 |
| 5,360,163 | 11/1994 | Dupre | 239/14.2 |

*Primary Examiner*—Peter A. Hruskuci
*Assistant Examiner*—Betsey J. Morrison
*Attorney, Agent, or Firm*—Anthony J. Casella; Gerald E. Hespos; Ludomir A. Budzyn

[57] ABSTRACT

A method of processing waste water comprises atomizing waste water under selected atmospheric conditions to achieve substantially complete phase change of the water. The atomization is conducted by spraying waste water from a nozzle mounted on a tower adjacent a catchment area for collecting ice crystals produced by the phase change of the atomized waste water into ice crystals, under atmospheric conditions favourable to freezing of atomized water droplets into ice.

8 Claims, 6 Drawing Sheets

LEGEND:

BOD$_5$ - BIOCHEMICAL OXYGEN DEMAND
SS - SUSPENDED SOLIDS
NH$_3$ - TOTAL KJELDAHL NITROGEN
NO$_2$ - NITRITES
NO$_3$ - NITRATES
TOTAL P - TOTAL PHOSPHORUS
SOL P - SOLUABLE PHOSPHORUS
SOL SALTS - SOLUABLE SALTS -SO$_4$ -Cl$_2$ - ETC.
COLIFORM TOTAL-
        FS - FECAL STREPTOCOCCI
        FC - FECAL COLIFORM
ND - NO DETECTABLE CHANGE/OR/NON-DETECTABLE
L4 - L10 - LESS THAN 4 OR LESS THAN 10

WASTE WATER TREATMENT METHOD AND APPARATUS

The present invention pertains to the field of waste water treatment. In particular, the present invention provides a method for waste water treatment that is particularly effective in cold climates, such a those experienced in alpine areas or in Northern regions in winter.

Waste water is produced in large quantities throughout the year, by every community. By the term 'waste water' is meant sanitary waste disposal water, i.e., the flow from sanitary sewers, industrial effluent, i.e., the flow from factories, mills, refineries, and other users of water in industrial settings, commercial effluent, i.e., the flow of waste water from service industries like restaurants and cleaning industries. In developed nations, it is desirable that 100% of waste water produced be treated in some way to ensure minimal negative environmental impact. To this end, most cities have built large sewage and waste water treatment facilities. These facilities are extremely expensive to build, operate and maintain, and they are of limited capacities.

If properly planned, waste water treatment facilities operate efficiently on a flow-through basis, and are able to process all of the waste water produced in any given period of time. However, efficient operation on such a basis is more difficult during winter months, when settling tanks may freeze, sewage lagoons freeze, rivers freeze over, but sewage keeps flowing in. Many facilities become over burdened by springtime, and it will be appreciated that by the time of the spring thaw, it has often been necessary to release untreated or partially treated waste water into the environment (i.e., receiving waters).

Furthermore, there are some communities located in Northern climes, or areas where sewage or waste water treatment is substantially impossible because the amount that must be stored over freezing months so far exceeds the amount that can practicably be processed during the milder months that a conventional treatment facility is not feasible. There are, similarly, communities such as ski and winter resort communities that have relatively small populations of permanent residents, but that support very large populations of winter visitors. These communities either do not have a summertime need for high capacity waste water treatment facilities, or must subject existing facilities to highly fluctuating seasonal loads.

There are also industrial processes carried out in Northern locations, for instance oil recovery from oil sands that use large quantities of water which is not easily processed with conventional technology. Food processing industries, moreover, are often in maximum production in the freezing months following a harvest, and therefore produce waste water during those months.

There are four basic principal concerns in dealing with normal sanitary waste water treatment. First, one must be concerned with the volume of waste water that is being treated. This is the concern that most affects cost: the object is to handle the largest volume of waste water by separation of the waste and nutrients from the water for the smallest expenditure.

Secondly, one is concerned with lowering the nitrogen content of the waste water to obtain treated water substantially free of nitrogen. Nitrogen, usually present as $NH_3$, $NH_4^+$, $NO_3^-$, or $NO_2^-$ in waste water, is a potent pollutant because it provides an essential nutrient to many micro-organisms that may exist in water destined for human consumption.

Thirdly, it is essential to lower bacterial counts in treated waste water to below mandated levels, which levels are generally in the order of 100–1000 per 100 ml.

Lastly, for aesthetic water quality reasons, it is necessary to lower phosphorous levels in waste water. Phosphorous, generally present as soluble phosphate ions in waste water, should be preferably kept below about 1 mg/l and preferably below 0.05 mg/l, to restrict algae and weed growth, since algae will deplete $O_2$ in receiving waters.

The present invention, non-biological in basic concept, therefore, achieves each of the foregoing basic concerns, and provides a cost efficient method for treating large quantities of waste water from residential, commercial or industrial sources, in cold climates, to produce clean water without the need to store the waste water until milder weather prevails. The present invention has identified and advantageously utilizes a number of phenomena manifested during atomization and phase-change from liquid to solid of waste water under low temperature (sub-zero) atmospheric conditions. Moreover, the present invention does so in a process that differentiates it from previous attempts, all relatively unsuccessful, to utilize psychromechanicals in waste water treatment. For instance, in a study entitled "Low-Temperature Sewage Disposal Through Snowmaking", by Zapf-Gilge, Russell and Mavinic, discussed the effects of concentrating impurities in the unfrozen portion of an ice pellet or similar structure. Zapf-Gilge et al, however, did not obtain viable results, finding unacceptably high concentrations of nitrogen and phosphorous in the resulting snowmelt water. Their study became, then, directed to suggestions on handling of the chronological melt fractions of a snowpack. The short coming of such a manner of approach is that it does not provide a method of treating waste water, it merely concentrates the impurities in the waste water, and results in a problem in the discharge water.

The present invention, however, provides a treatment method that does not merely concentrate nutrients and contaminants. The present invention essentially removes substantially all nitrogen from the waste water, while at the same time precipitating the phosphates therefrom as benign insoluble alkaline salts. Moreover, the method of the present invention results in virtually complete elimination of bacteria in the waste water.

In a broad aspect, therefore, the present invention relates to a method of processing waste water comprising atomizing said waste water under selected atmospheric conditions to achieve substantially complete phase change of said water.

In another broad aspect, the present invention relates to a method of conversion of soluble phosphate ions in waste water that includes phosphate ions, ammonia gas, ammonium ions, calcium ions and magnesium ions, comprising atomization of said waste water under atmospheric conditions appropriate for the substantially complete phase change of said waste water to ice crystals or water vapour, whereby ammonium ions under the influence of increased pH in said waste water form ammonia gas, and phosphate ions in said waste water combine with calcium or magnesium ions as calcium phosphate and magnesium phosphate respectively and precipitate as insoluble salts.

BRIEF DESCRIPTION OF DRAWINGS

In drawings that illustrate the present invention by way of example.

Figure 1:
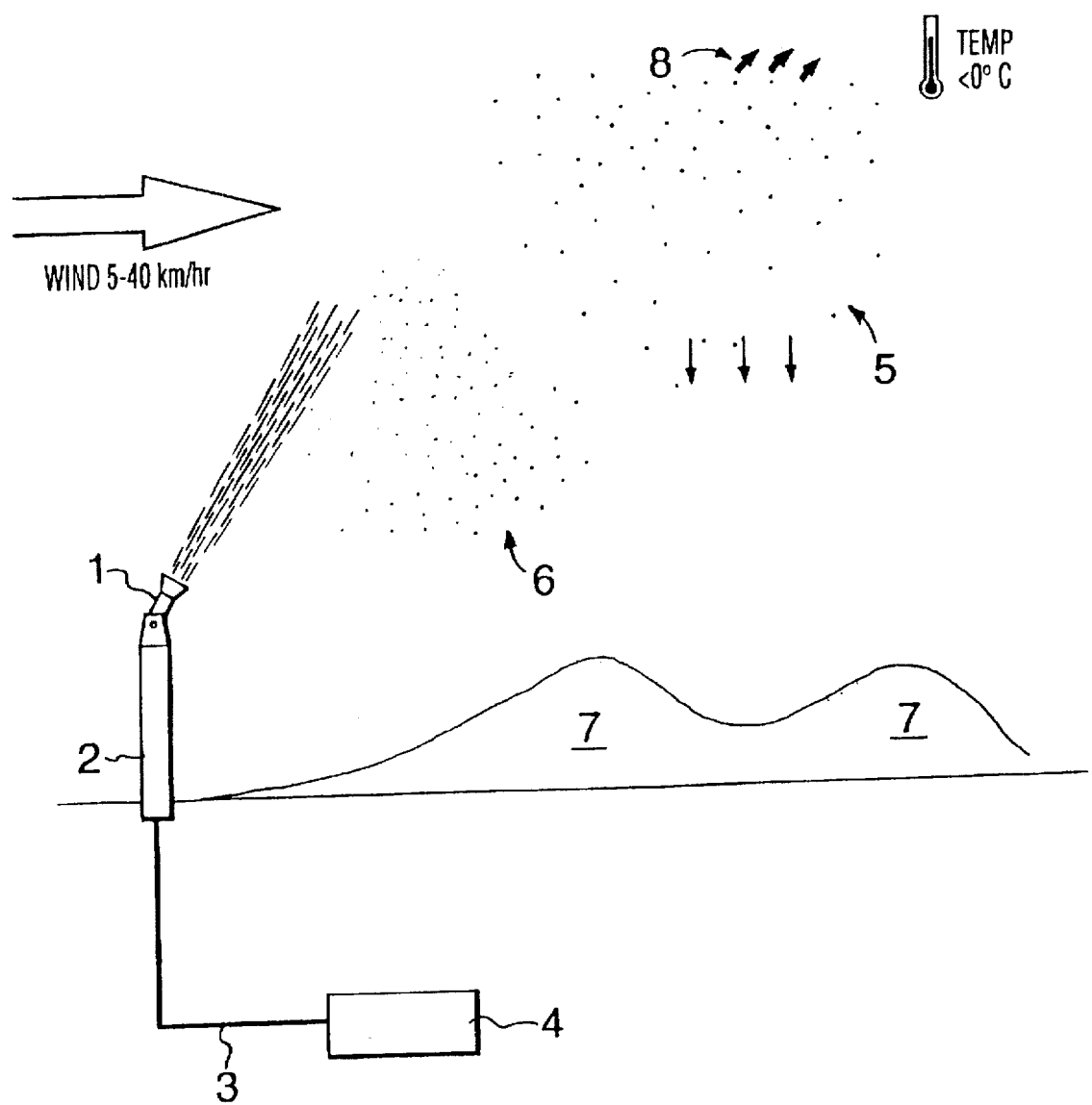
FIG. 1 is a schematic of the method of the present invention.
Figure 2:
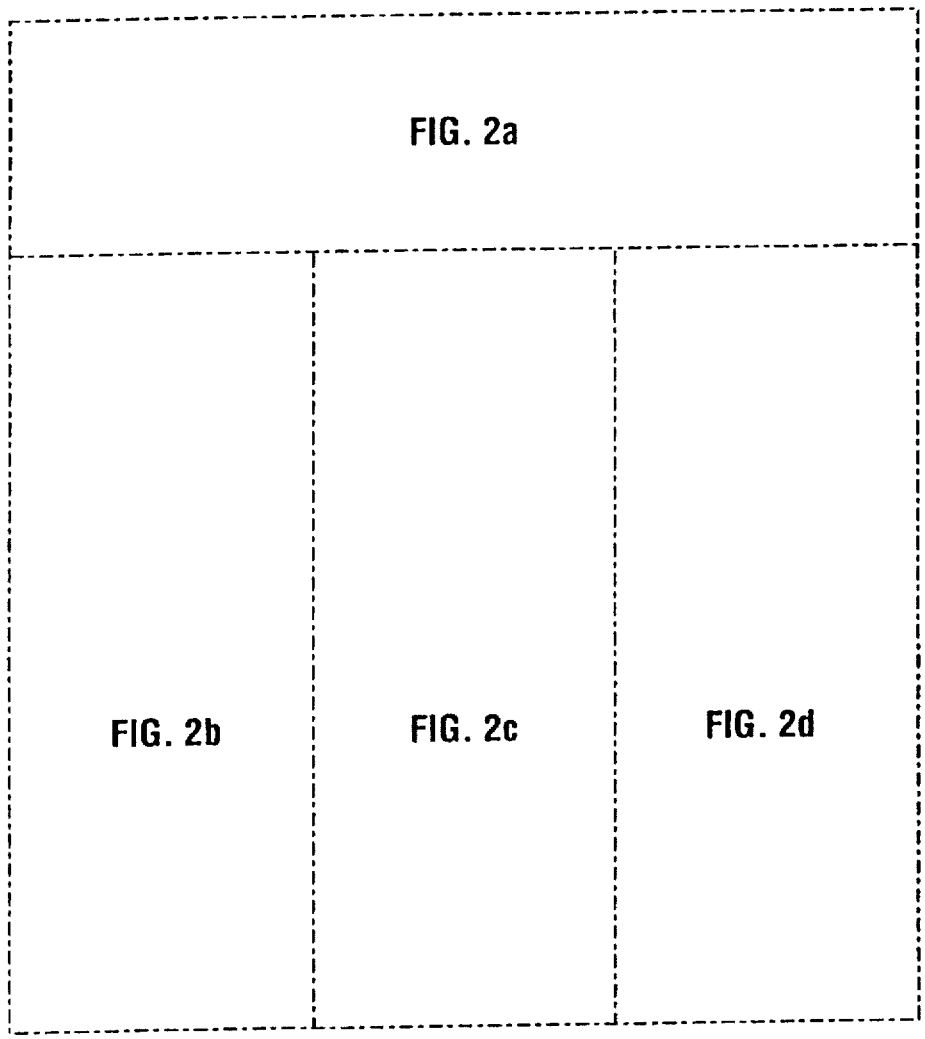
FIG. 2 which comprises
Figure 2A:
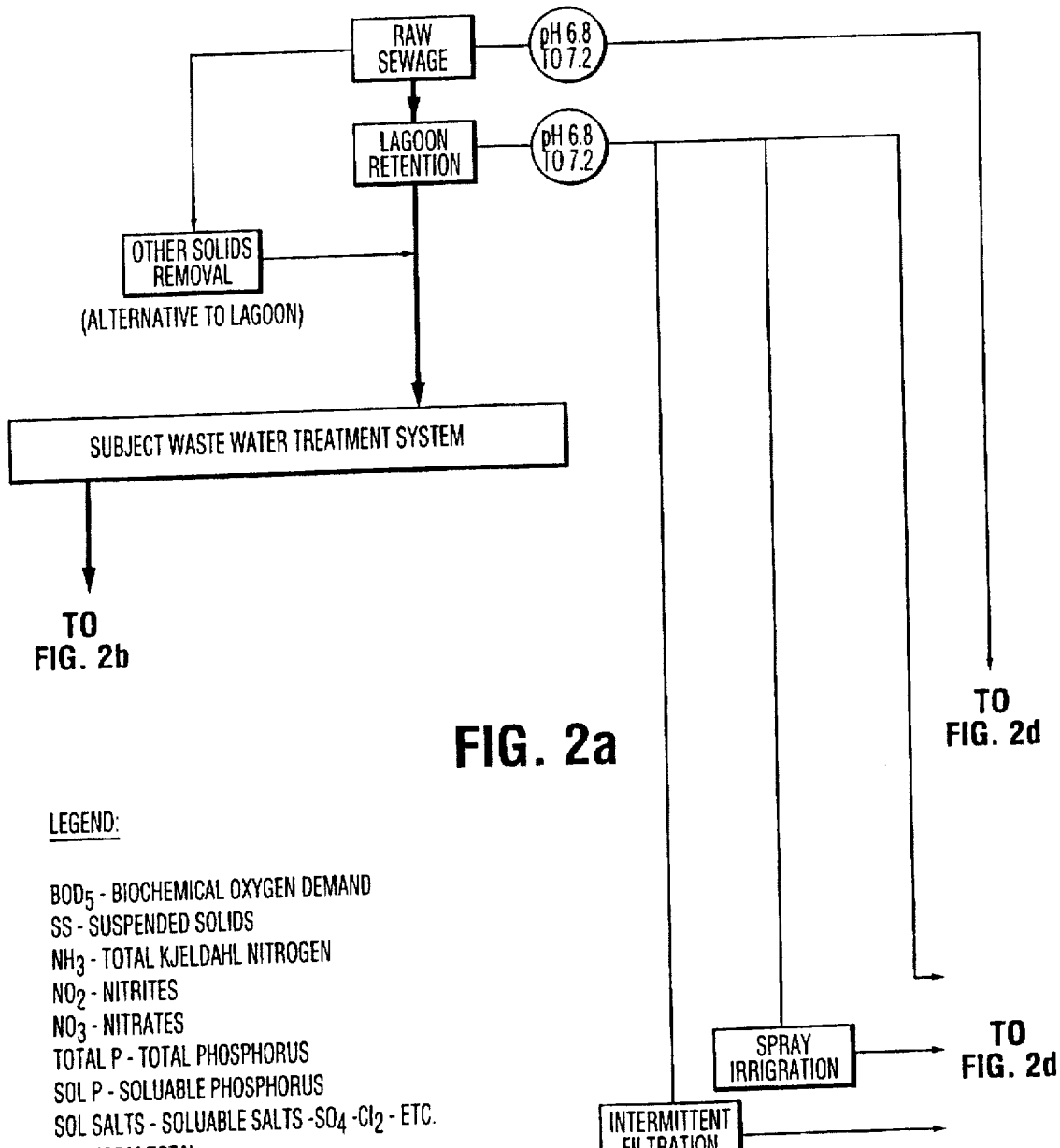
FIGS. 2a, 2b, 2c, and 2d is a flow/comparison chart illustrating the method of the present invention, and comparing it in relative quantitative terms with some typical basic conventional waste water treatment methods.
Figure 2B:
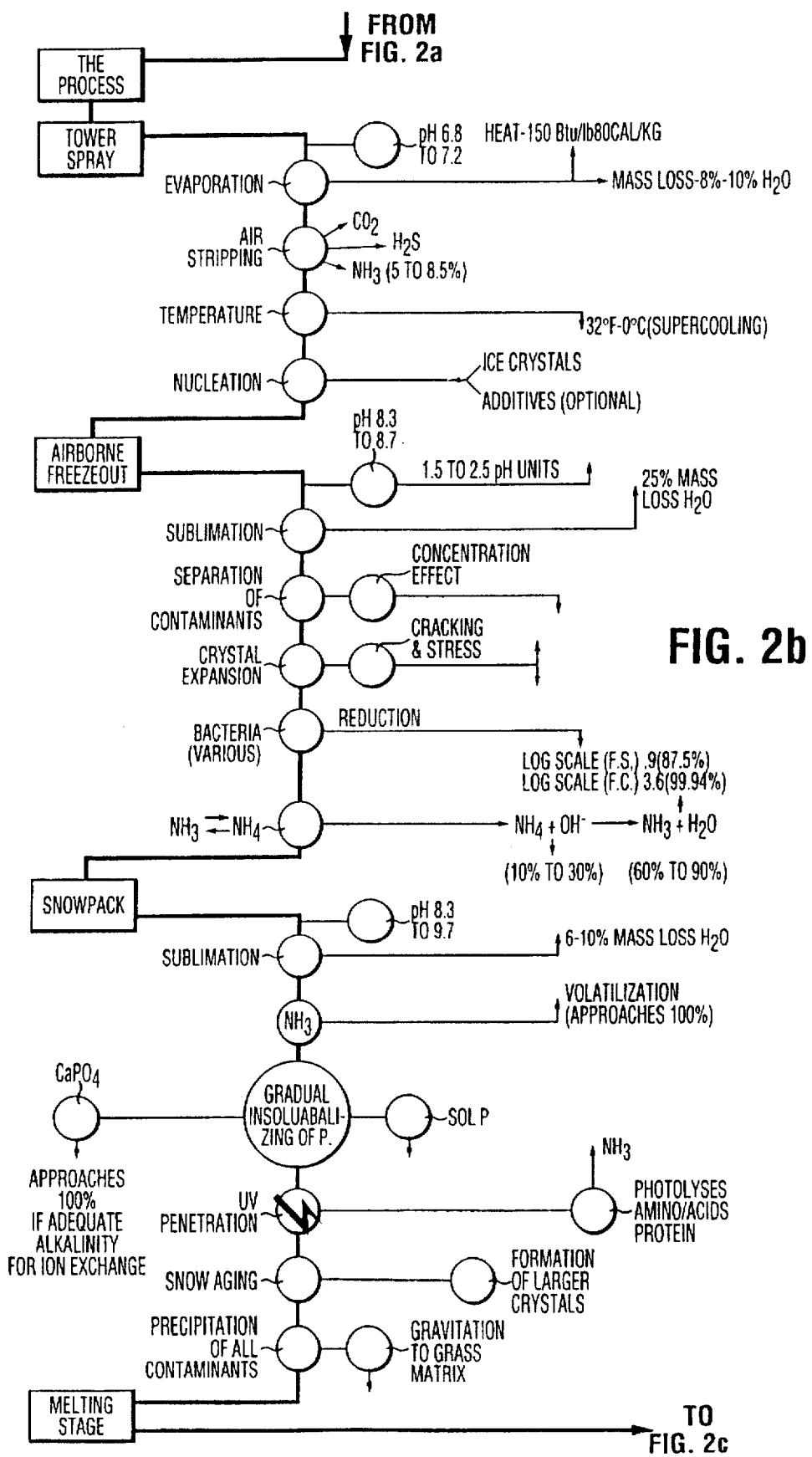
Figure 2C:
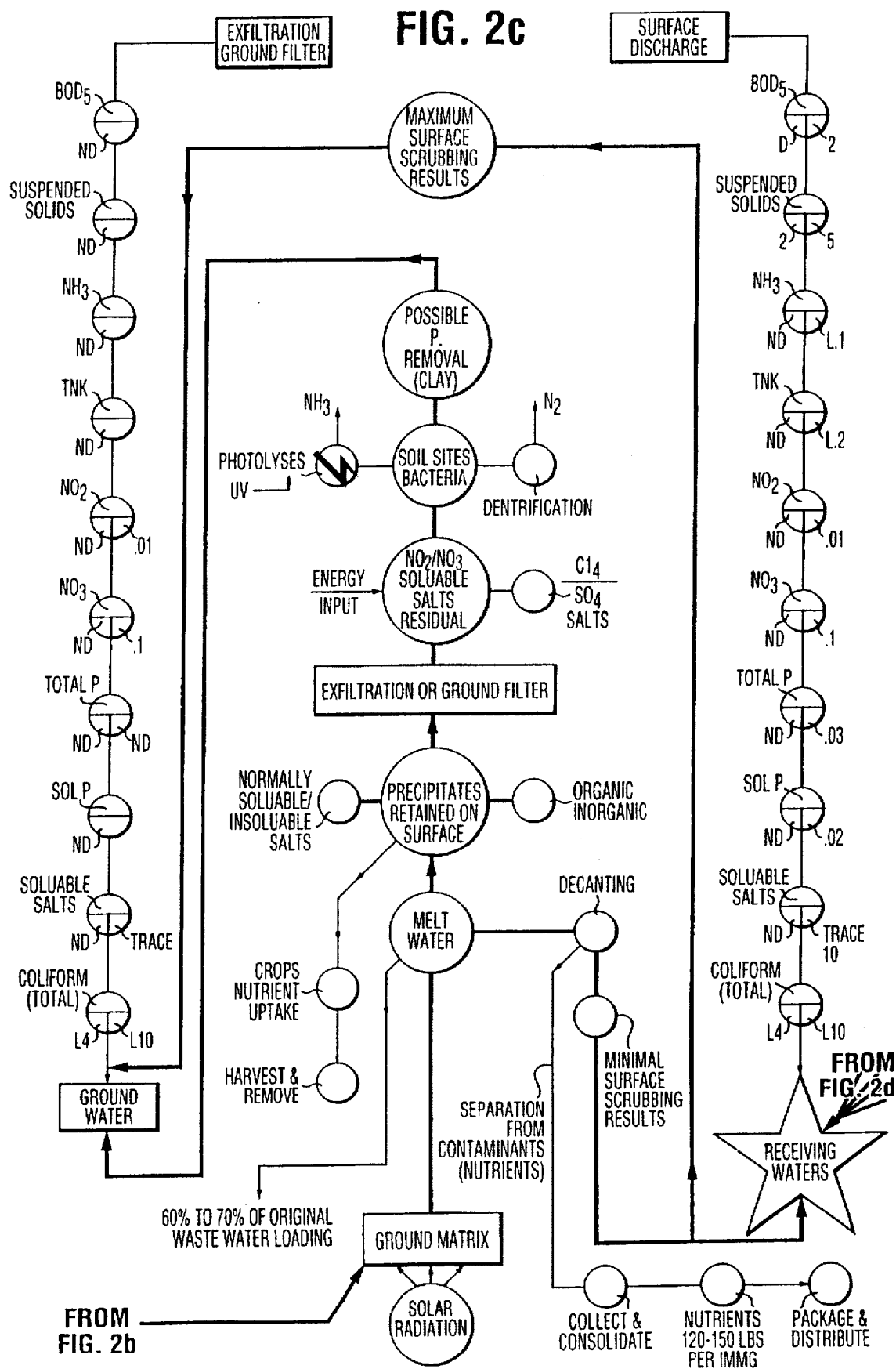
Figure 2D:
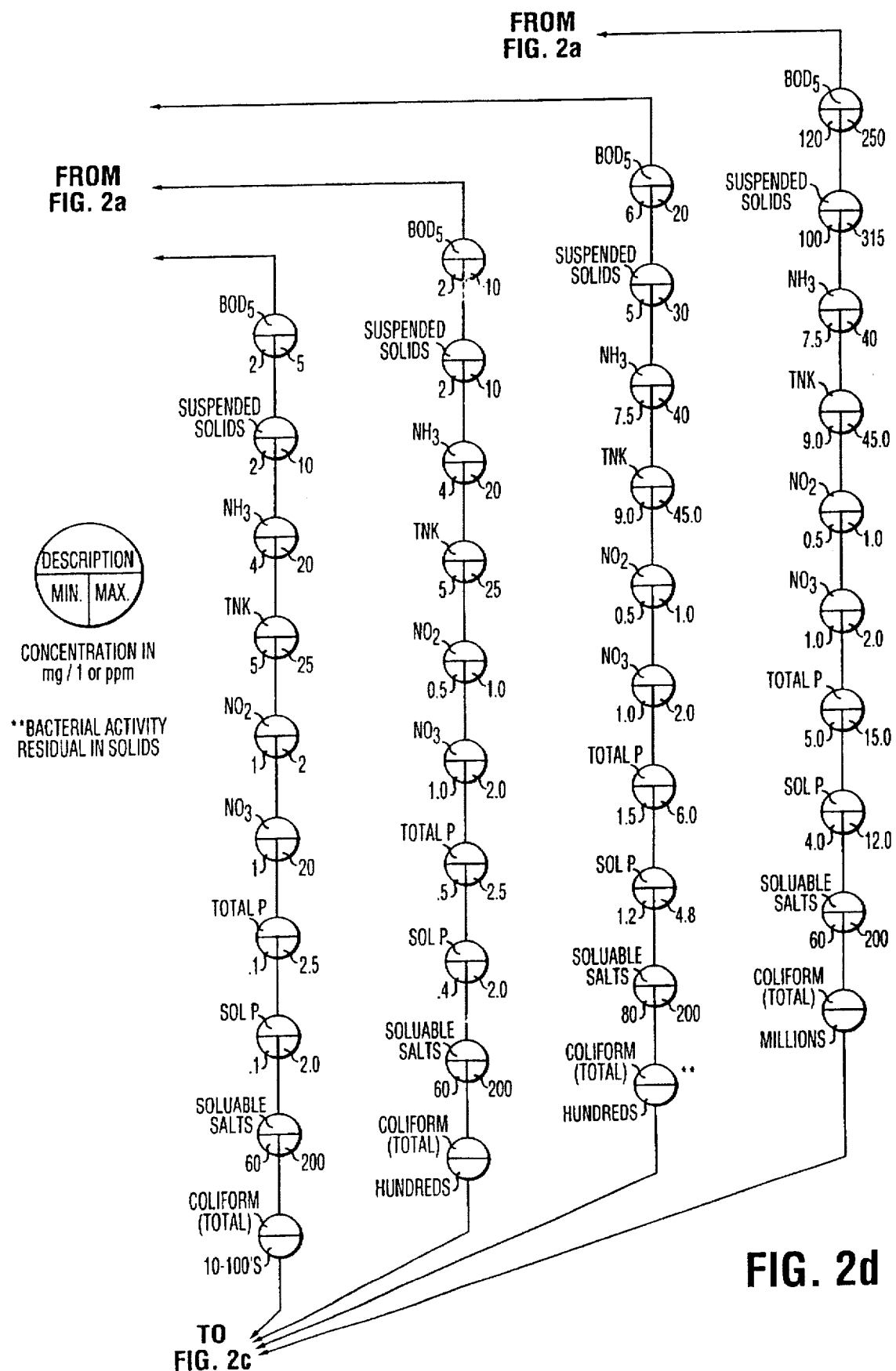

Referring to the drawings, in FIG. 1, a typical installation and application of the present invention is illustrated schematically. A reservoir 4 of untreated or partially treated sewage, which may or may not have been permitted to settle somewhat, depending on the density of solids therein, and the local options for disposal of sludge, is pumped via a pipeline 3, to a treatment facility according to the present invention. A nozzle 1, is provided, preferably on a tower 2 (but not necessary). The nozzle is a compressed air type water atomization type, such as that described in U.S. Pat. No. 5,135,167. These nozzles are modified as compared with those used in commercial snowmaking operations to ensure complete freeze out, and find excellent application in the present invention, because of their ability to finely atomize the total fluid stream passing through the nozzle. As the fluid is ejected from the nozzle under high air pressure of from 100 to 500 psia or greater, the fluid will undergo a rapid pressure drop of from about 500 psia to about 15 psia, causing atomization, and immediate evaporation of up to about 8% to 10% of the water content. In addition, carbon dioxide and some ammonia gas, $H_2S$, etc., which are volatile under these conditions, will be stripped from the atomized waste water droplets before the water forms ice crystals.

As ammonia gas volatilizes, the equilibrium between ammonia, $NH_3$ and ammonium ions will tend to shift, as follows:

(normal) $NH_4^+ + OH^- = NH_3 + H_2O$ ($NH_3$ volatilizing) $NH_4^+ + OH^- = NH_3\uparrow + H_2O$ Moreover, as $CO_2$, is stripped from the atomized waste water, the following occurs:

$HCO_3^- \rightarrow CO_2\uparrow + OH\_$ $HCO_3^-$is the usual form of $CO_2$ in aqueous solution. Therefore, as $CO_2$ is stripped, the aqueous solution will become more basic. Since the equilibrium constant Kb for ammonia, $1.8\times10^{-5}$ is calculated by $$\frac{[NH_4^+][OH^-]}{[NH_3]}$$

as $[OH_{31}]$ increases, i.e., as pH increases, then for Kb to be maintained, $[NH_4^+]$ will decrease, and $[NH_3]$ will increase absolutely, but decrease in solution slightly, due to continuing volatilization of $NH_3$.

Therefore, the first significant observation is that the method of the present invention results in a lowering of $NH_4^+$concentration in the waste water. It is $NH_4^+$that solubilizes $PO_4^{--}$and $PO_3^{--}$and in the waste water. As $NH_4^+$ decreases, then these phosphate ions will tend to combine with $Ca^{++}$, or $Mg^+$, found in the waste water, and precipitate out and remain as an insoluble salt on the ground matrix.

The method of the present invention, therefore, is effective to reduce $NH_3$, $NH_4^+$, $PO_3^{--}$and $PO_4^{--}$concentrations simultaneously, and by operating selectively in conditions resulting in substantially complete freeze out of the ice crystals, this goal is accomplished. Moreover, it is this essential feature of the present invention, substantially complete freeze out of the waste water crystals, which distinguishes the present invention from the failed experiments of the past in this area. If freeze-out is not complete, then a liquid aqueous fraction will continue to exist during the entire flight of the ice crystal (partly frozen). Such a liquid fraction will contain reactive $CO_2$, $NH_4^+$and phosphates, that must be attended to on the ground. In essence, such a result is: untreated water up, untreated water down. The result of the present invention, however, is untreated water up, substantially pure water down, some harmless solid salts, harmless ammonia gas released, $CO_2$ released.

With regard to bacteria, moreover, the method of the present invention, by which complete freeze out of the atomized waste water is accomplished, will be lethal to substantially all bacteria. Bacteria found in waste water are unicellular, aqueous organisms. Incomplete freeze out of the waste water, as was the result accomplished in the prior failed experiments and studies, resulted in a large fraction of bacteria deposited into the snowpack, reduced in activity, but alive. In the method of the present invention, however, complete freeze through of the ice crystals results in complete killing of the resident bacteria, by either direct fracturing of the cell walls thereof by the expansive nature of the freezing process, or osmotic pressure rupturing of the walls as well as the temperature below which many types of bacteria will not survive. Only in the present 100% change of state process can these conditions be attained.

It will be understood from the foregoing discussion that an essential aspect of the present invention is substantially complete freezing through of the ice crystals formed by careful atomization and nucleation of a waste water stream.

With reference to FIG. 1, this is accomplished by:

i) conducting the process only at relatively low temperature. Below 0° C. wet bulb is essential. Below −5° C. is preferable, and the range of −0° C. and below is preferable still.

ii) For maximum freezing efficiency and spread, the ice crystals being projected from nozzle 1 should have a resultant flight direction of about 45° from the horizontal. This can be determined, on any given day, by determining the wind speed, and adjusting the angle of the nozzle. Wind speeds of >0 to 70 km/hr, preferably 5 km/hr to 70 km/hr are desirable, so that the crystals and by products will fall in a known area to create a snowpack 7, as shown in FIG. 1. Nozzle angles, from the horizontal will vary from 0° to 90° and are chosen so that the combined effect of wind and elevation will be equivalent to 45° elevation in calm wind conditions. 45° is preferred to ensure a long flight time, complete freeze out and optimal spread of the snowpack.

iii) A compressed air nozzle, as described above is utilized. It will be noted that a hydraulic or airless nozzle may be used, but with less satisfactory freeze out results, and will require special nucleation agents. Using the compressed air nozzle will result in production of a significant number of very small droplets, that will experience better air stripping, better evaporation 8, better atomizing and relatively quick formation of a large number of small to medium sized ice crystals 5, that will freeze out completely before landing in and creating the snowpack 7. In addition, a fine haze of the very smallest ice particles 6 will form, and will not fall quickly due to low mass, better aerodynamics, and lower terminal velocity. This haze of crystals will create a zone of nucleation sites for any larger water droplets that may be falling and have not yet begun to freeze.

Referring now to FIG. 2 which comprises FIGS. 2a, 2b, 2c and 2d, typical results achievable with the method of the present invention, are compared to alternate methods. As well, the small difference in discharge water quality utilizing the present invention, between surface discharge or run-off water, and exfiltration water, i.e., water that has percolated through the ground into the water table is shown.

On the extreme right, raw sewage parameters are quantified. Treatment in a sewage lagoon, without aeration or spraying or filtration is shown in the next line, with typical results achieved with spray irrigation and finally with large scale filtration shown on the next two lines. It will be understood that the latter two results are normally striven for, and if achieved, are considered satisfactory for secondary level treatment standards. The following two lines of data records the results obtained from surface run-off and ground filtration of waste water treated according to the present invention. It will be noted that in every aspect, the results of the present invention meet or exceed the results obtained according to conventional waste water treatment (better than tertiary treatment).

On the left, and to the bottom of the chart, the method of the present invention is illustrated together with the effects of the natural forces that will act upon the waste water when it is treated according to the present invention. That is, the present invention essentially comprises the controlled atomization of waste water under selected atmospheric conditions. The actions of nature that occur after the present invention is carried out are not controllable, but the applicant has accounted for them in development of the present invention. For instance, the aging of a snowpack will occur naturally. The applicant can, and has demonstrated the beneficial effects occurring as a result of this natural process, but that is not a part of the present invention.

It is to be understood that the examples described above are not meant to limit the scope of the present invention. It is expected that numerous variants will be obvious to the person skilled in the field to which the present invention pertains without any departure from the spirit of the invention. The appended claims, properly construed, form the only limitation upon the scope of the invention.

I claim:

1. A method of conversion of soluble phosphates from waste water that includes phosphate ions solubilized as ammonium phosphate, ammonia, ammonium ions, carbonic acid, alkaline cations including calcium and magnesium cations, comprising atomizing said waste water into atmospheric conditions appropriate for the substantially complete phase change of said waste water to ice crystals or water vapour, thereby causing release of $CO_2$ and $NH_3$ from said waste water, and consequently causing an increased pH of said waste water, said increased pH driving conversion of the ammonium ions to ammonia gas, to achieve a lower concentration of the ammonium ions in said waste water, to cause said phosphate ions in said waste water to combine with the alkaline cations and precipitate as insoluble phosphate salts.

2. A method as claimed in claim 1, wherein said alkaline cations are said magnesium or calcium cations.

3. A method as claimed in claim 2, wherein said atomizing is effected by spraying said waste water into the atmosphere utilizing compressed air.

4. A method as claimed in claim 3, wherein said atomizing is effected by spraying said waste water into the atmosphere in a direction of from 0° to 90° to the horizontal.

5. A method as claimed in claim 4, wherein said atomizing is conducted at an atmospheric temperature of less than 0° C. wet bulb temperature.

6. A method as claimed in claim 5, wherein said atomizing is conducted by spraying said waste water from a nozzle mounted on a tower adjacent a catchment area for collecting ice crystals produced by the phase change of the atomized waste water into ice crystals.

7. A method as claimed in claim 6, wherein said atomizing is conducted when prevailing wind conditions are such as to permit the said ice crystals to fall into the catchment area.

8. A method as claimed in claim 11, wherein the phase changes effected by the waste water during said atomizing include freezing of water into ice; evaporation of water into water vapour; and maximizing sublimation of ice crystals into water vapour.

* * * * *